(12) United States Patent
Klein et al.

(10) Patent No.: US 10,788,934 B2
(45) Date of Patent: Sep. 29, 2020

(54) INPUT ADJUSTMENT

(71) Applicant: Microsoft Technology Licensing, LLC, Redmond, WA (US)

(72) Inventors: Christian Klein, Duvall, WA (US); Jan-Kristian Markiewicz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 15/685,219

(22) Filed: Aug. 24, 2017

(65) Prior Publication Data
US 2018/0329574 A1    Nov. 15, 2018

Related U.S. Application Data

(60) Provisional application No. 62/505,942, filed on May 14, 2017.

(51) Int. Cl.
*G06F 3/041* (2006.01)
*G06F 1/16* (2006.01)
(Continued)

(52) U.S. Cl.
CPC .......... *G06F 3/0418* (2013.01); *G06F 1/1615* (2013.01); *G06F 1/1616* (2013.01);
(Continued)

(58) Field of Classification Search
CPC .... G06F 9/4411; G06F 9/44505; G06F 9/445; G06F 9/4401; G06F 9/451; G06F 1/1692; G06F 1/1618; G06F 1/1615; G06F 1/1641; G06F 1/1677; G06F 1/1647; G06F 1/1681; G06F 1/1694; G06F 1/1643; G06F 3/0487; G06F 3/04883; G06F 3/1446; G06F 3/1616; G06F 3/017; G06F 3/011; G06F 3/03545; G06F 3/0418; G06F 3/041; G06F 2203/04803; G06F 2200/1637; G09G 5/003; G09G 5/14; G09G 2356/00;
(Continued)

(56) References Cited

U.S. PATENT DOCUMENTS

| 5,761,485 A | 6/1998 | Munyan |
| 6,222,507 B1 | 4/2001 | Gouko |

(Continued)

FOREIGN PATENT DOCUMENTS

| EP | 1538549 A1 | 6/2005 |
| EP | 1868068 A1 | 12/2007 |

(Continued)

OTHER PUBLICATIONS

"Non-final Office Action Issued in U.S Appl. No. 15/797,266", dated Jan. 29, 2019, 22 Pages.
(Continued)

*Primary Examiner* — David Tung

(57) ABSTRACT

Techniques for input adjustment are described. In one or more implementations, a user perspective of a display surface is estimated, and is used to correlate output that is displayed on the display surface. According to one or more implementations, detected motion of a display surface is used to compensate for an effect of the motion on input to the display surface.

20 Claims, 12 Drawing Sheets

(51) Int. Cl.

| | | |
|---|---|---|
| *G06F 9/445* | (2018.01) | |
| *G06F 3/0487* | (2013.01) | |
| *G06F 3/14* | (2006.01) | |
| *G09G 5/00* | (2006.01) | |
| *G09G 5/14* | (2006.01) | |
| *G06F 3/01* | (2006.01) | |
| *G06F 3/0354* | (2013.01) | |
| *G06F 3/0488* | (2013.01) | |
| *G06F 9/4401* | (2018.01) | |
| *G06F 9/451* | (2018.01) | |
| *G06K 9/00* | (2006.01) | |
| *G06K 9/22* | (2006.01) | |

(52) U.S. Cl.
CPC ......... *G06F 1/1618* (2013.01); *G06F 1/1641* (2013.01); *G06F 1/1647* (2013.01); *G06F 1/1677* (2013.01); *G06F 1/1681* (2013.01); *G06F 1/1692* (2013.01); *G06F 1/1694* (2013.01); *G06F 3/011* (2013.01); *G06F 3/017* (2013.01); *G06F 3/03545* (2013.01); *G06F 3/0487* (2013.01); *G06F 3/04883* (2013.01); *G06F 3/1423* (2013.01); *G06F 3/1446* (2013.01); *G06F 9/4401* (2013.01); *G06F 9/445* (2013.01); *G06F 9/4411* (2013.01); *G06F 9/44505* (2013.01); *G09G 5/003* (2013.01); *G09G 5/14* (2013.01); *G06F 1/1643* (2013.01); *G06F 3/041* (2013.01); *G06F 9/451* (2018.02); *G06F 2200/1637* (2013.01); *G06F 2203/04803* (2013.01); *G06K 9/00154* (2013.01); *G06K 9/00416* (2013.01); *G06K 9/00422* (2013.01); *G06K 9/00993* (2013.01); *G06K 9/222* (2013.01); *G09G 2320/0626* (2013.01); *G09G 2320/0686* (2013.01); *G09G 2330/021* (2013.01); *G09G 2330/022* (2013.01); *G09G 2340/0407* (2013.01); *G09G 2354/00* (2013.01); *G09G 2356/00* (2013.01); *G09G 2360/144* (2013.01); *G09G 2370/022* (2013.01)

(58) Field of Classification Search
CPC ... G09G 2320/0626; G09G 2320/0686; G09G 2340/0407; G09G 2354/00; G06K 9/222; G06K 9/00993; G06K 9/00422; G06K 9/00154; G06K 9/00416
See application file for complete search history.

(56) References Cited

U.S. PATENT DOCUMENTS

| | | | |
|---|---|---|---|
| 7,184,025 B2 | 2/2007 | Williams et al. | |
| 7,190,375 B2 | 3/2007 | Dresevic et al. | |
| 7,397,485 B2 | 7/2008 | Miller et al. | |
| 9,092,183 B2 | 7/2015 | Reeves et al. | |
| 9,189,773 B2 | 11/2015 | Webber | |
| 9,224,355 B2 | 12/2015 | Wu et al. | |
| 9,298,282 B2 | 3/2016 | Liberty | |
| 9,406,281 B2 | 8/2016 | Lee | |
| 9,489,080 B2 | 11/2016 | Seo et al. | |
| 9,524,139 B2 | 12/2016 | Aurongzeb et al. | |
| 9,549,060 B2 | 1/2017 | Wohlert et al. | |
| 9,600,595 B2 | 3/2017 | DeLuca et al. | |
| 9,619,008 B2 | 4/2017 | North et al. | |
| 2005/0160371 A1 | 7/2005 | Karson et al. | |
| 2005/0270278 A1* | 12/2005 | Ouchi | G06F 3/03545 345/173 |
| 2006/0034042 A1 | 2/2006 | Hisano et al. | |
| 2007/0075915 A1 | 4/2007 | Cheon et al. | |
| 2008/0024388 A1 | 1/2008 | Bruce | |
| 2009/0201246 A1 | 8/2009 | Lee et al. | |
| 2009/0303208 A1 | 12/2009 | Case et al. | |
| 2010/0081475 A1 | 4/2010 | Chiang et al. | |
| 2010/0182265 A1 | 7/2010 | Kim et al. | |
| 2010/0225601 A1* | 9/2010 | Homma | G06F 3/0416 345/173 |
| 2010/0235823 A1 | 9/2010 | Gathers et al. | |
| 2010/0245106 A1 | 9/2010 | Miller et al. | |
| 2010/0321275 A1 | 12/2010 | Hinckley et al. | |
| 2010/0333041 A1 | 12/2010 | Fabrick | |
| 2011/0074717 A1* | 3/2011 | Yamashita | G06F 1/1654 345/173 |
| 2011/0263339 A1 | 10/2011 | Cole et al. | |
| 2011/0304537 A1 | 12/2011 | Eruchimovitch et al. | |
| 2012/0026104 A1* | 2/2012 | Ho | G06F 3/0418 345/173 |
| 2012/0050177 A1* | 3/2012 | Simmons | G06F 1/1641 345/173 |
| 2012/0113019 A1 | 5/2012 | Anderson | |
| 2012/0154294 A1* | 6/2012 | Hinckley | G06F 1/1649 345/173 |
| 2012/0242599 A1 | 9/2012 | Seo et al. | |
| 2012/0266098 A1 | 10/2012 | Webber | |
| 2012/0306768 A1* | 12/2012 | Bailey | G09G 5/00 345/173 |
| 2012/0327133 A1* | 12/2012 | Eguchi | G09G 3/3611 345/690 |
| 2013/0033415 A1 | 2/2013 | Chang et al. | |
| 2013/0076591 A1 | 3/2013 | Sirpal et al. | |
| 2013/0094430 A1 | 4/2013 | Mills et al. | |
| 2013/0169564 A1 | 7/2013 | Sano et al. | |
| 2013/0219329 A1 | 8/2013 | Tomimori | |
| 2013/0234929 A1 | 9/2013 | Libin | |
| 2013/0321264 A1 | 12/2013 | Park et al. | |
| 2013/0321340 A1 | 12/2013 | Seo et al. | |
| 2014/0101575 A1 | 4/2014 | Kwak et al. | |
| 2014/0101579 A1 | 4/2014 | Kim et al. | |
| 2014/0132514 A1 | 5/2014 | Kuzara et al. | |
| 2014/0145966 A1 | 5/2014 | Gardenfors | |
| 2014/0210737 A1* | 7/2014 | Hwang | G06F 3/0412 345/173 |
| 2014/0267176 A1* | 9/2014 | Bathiche | G06F 3/0418 345/178 |
| 2014/0267178 A1 | 9/2014 | Bathiche et al. | |
| 2014/0375596 A1 | 12/2014 | Kim et al. | |
| 2015/0116362 A1 | 4/2015 | Aurongzeb et al. | |
| 2015/0116364 A1 | 4/2015 | Aurongzeb et al. | |
| 2015/0212545 A1 | 7/2015 | Ding | |
| 2015/0227225 A1 | 8/2015 | Park et al. | |
| 2015/0234629 A1 | 8/2015 | Park | |
| 2015/0242039 A1 | 8/2015 | Chang et al. | |
| 2015/0261374 A1 | 9/2015 | Eguchi et al. | |
| 2015/0324162 A1 | 11/2015 | Kim et al. | |
| 2016/0011719 A1 | 1/2016 | Andersson | |
| 2016/0034059 A1 | 2/2016 | Graf et al. | |
| 2016/0041757 A1 | 2/2016 | Sirpal et al. | |
| 2016/0055324 A1 | 2/2016 | Agarwal | |
| 2016/0086568 A1 | 3/2016 | Imamura et al. | |
| 2016/0098063 A1 | 4/2016 | Lee et al. | |
| 2016/0249749 A1 | 9/2016 | Bull | |
| 2017/0031434 A1 | 2/2017 | Files et al. | |
| 2017/0038934 A1 | 2/2017 | Sirpal et al. | |
| 2017/0052751 A1 | 2/2017 | Aurongzeb et al. | |
| 2017/0085563 A1 | 3/2017 | Royyuru | |
| 2017/0139535 A1* | 5/2017 | Files | G06F 3/0418 |
| 2017/0193489 A1 | 7/2017 | Jeon | |
| 2017/0206525 A1 | 7/2017 | Sylvain | |
| 2017/0337025 A1 | 11/2017 | Finnan | |
| 2018/0329508 A1 | 11/2018 | Klein et al. | |
| 2018/0329718 A1 | 11/2018 | Klein et al. | |
| 2018/0330694 A1 | 11/2018 | Klein et al. | |
| 2020/0117473 A1 | 4/2020 | Klein et al. | |

FOREIGN PATENT DOCUMENTS

| | | |
|---|---|---|
| EP | 2674834 A2 | 12/2013 |
| EP | 3093759 A2 | 11/2016 |

(56) References Cited

FOREIGN PATENT DOCUMENTS

| IN | 2024CHE2014 | | 1/2016 |
|---|---|---|---|
| WO | 2010028403 | A1 | 3/2010 |
| WO | 2015191468 | A1 | 12/2015 |

OTHER PUBLICATIONS

"Non Final Office Action Issued in U.S. Appl. No. 15/834,378", dated Nov. 23, 2018, 12 Pages.

"Acer ICONIA—User Guide", Retrieved From: https://www.manualsllb.com/manual/353947/Acer-Iconia-6120,html, Nov. 1, 2010, 110 Pages.

"Windows 10—Wikipedia", Retrieved From: https://en.wikipedia.org/w/index.php?title=Windows 10&oldid=779989647, Jul. 9, 2018, 47 Pages.

"International Search Report and Written Opinion issued in PCT Application No. PCT/US18/028756", dated Jul. 4, 2018, 13 Pages.

"International Search Report and Written Opinion issued in PCT Application No. PCT/US18/028775", dated Sep. 13, 2018, 17 Pages.

"Invitation to Pay Additional Fee Issued in PCT Application No. PCT/US18/028775", dated Jul. 6, 2018, 11 Pages.

"International Search Report and Written Opinion issued in PCT Application No. PCT/US18/028778", dated Jul. 18, 2018, 15 Pages.

"International Search Report & Written Opinion for PCT Patent Application No. PCT/US18/028780", dated Oct. 26, 2018, 17 Pages.

"Invitation to Pay Additional Fee Issued in PCT Application No. PCT/US18/028780", dated Jul. 20, 2018, 10 Pages.

"Final Office Action Issued in U.S. Appl. No. 15/834,378", dated May 23, 2019, 9 Pages.

Accessibility Requirements for People with Low Vision, Retrieved from <https://w3c.github.io/low-vision-a11y-tf/requirements.html> on Jun. 7, 2017, 25 pages, Published Sep. 26, 2016.

Murph, Darren, Kyocera Echo review,https://www.engadget.com/2011/04/13/kyocera-echo-review/, 14 pages, Published Apr. 13, 2011.

"Non Final Office Action Issued in U.S. Appl. No. 15/834,343", dated Nov. 19, 2019, 21 Pages.

"Non Final Office Action Issued in U.S. Appl. No. 16/709,161", dated Jul. 1, 2020, 6 pages.

* cited by examiner

INPUT ADJUSTMENT

RELATED APPLICATION

This application claims priority under 35 U.S.C. § 119(e) to U.S. Provisional Patent Application No. 62/505,942, filed 14 May 2017 and titled "Multi-Display Device Techniques," the entire disclosure of which is incorporated by reference in its entirety.

BACKGROUND

Devices today (e.g., computing devices) typically support a variety of different input techniques. For instance, a particular device may receive input from a user via a keyboard, a mouse, voice input, pen input, touch input (e.g., to a touchscreen), and so forth. One particularly intuitive input technique enables a user to utilize an instrument (e.g., a pen, a stylus, a finger, and so forth) to provide freehand input to a touch-sensing functionality such as a touchscreen. The freehand input can be used for various purposes, such as for applying digital ink, for selecting content, for applying gestures, and so forth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for input adjustment are described. In one or more implementations, a user perspective of a display surface is estimated, and is used to correlate output that is displayed on the display surface. According to one or more implementations, detected motion of a display surface is used to compensate for an effect of the motion on input to the display surface.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for input adjustment are described. In one or more implementations, a user perspective of a display surface is estimated, and is used to correlate output that is displayed on the display surface. For instance, when a user manipulates a pen to provide ink input to the display surface, an estimated user viewing angle is used to determine an output location for ink output. Generally, this attempts to provide a closer correlation between a user's perception of a point of input, and the output of the ink.

According to one or more implementations, detected motion of a display surface is used to compensate for an effect of the motion on input to the display surface. For instance, vibration and other inadvertent motions of the display surface are detected, and are used to process input to the display surface. In some implementations, this involves applying modifications to ink input to the display surface. Alternatively or additionally, gesture recognition is modified to increase a likelihood that a user gesture to the display surface is correctly interpreted.

In the following discussion, an example environment is first described that is operable to employ techniques described herein. Next, a section entitled "Example Implementation Scenarios and Procedures" describes some example implementation scenarios and methods for input adjustment in accordance with one or more embodiments. Finally, a section entitled "Example System and Device" describes an example system and device that are operable to employ techniques discussed herein in accordance with one or more embodiments.

Example Environment

Figure 1:
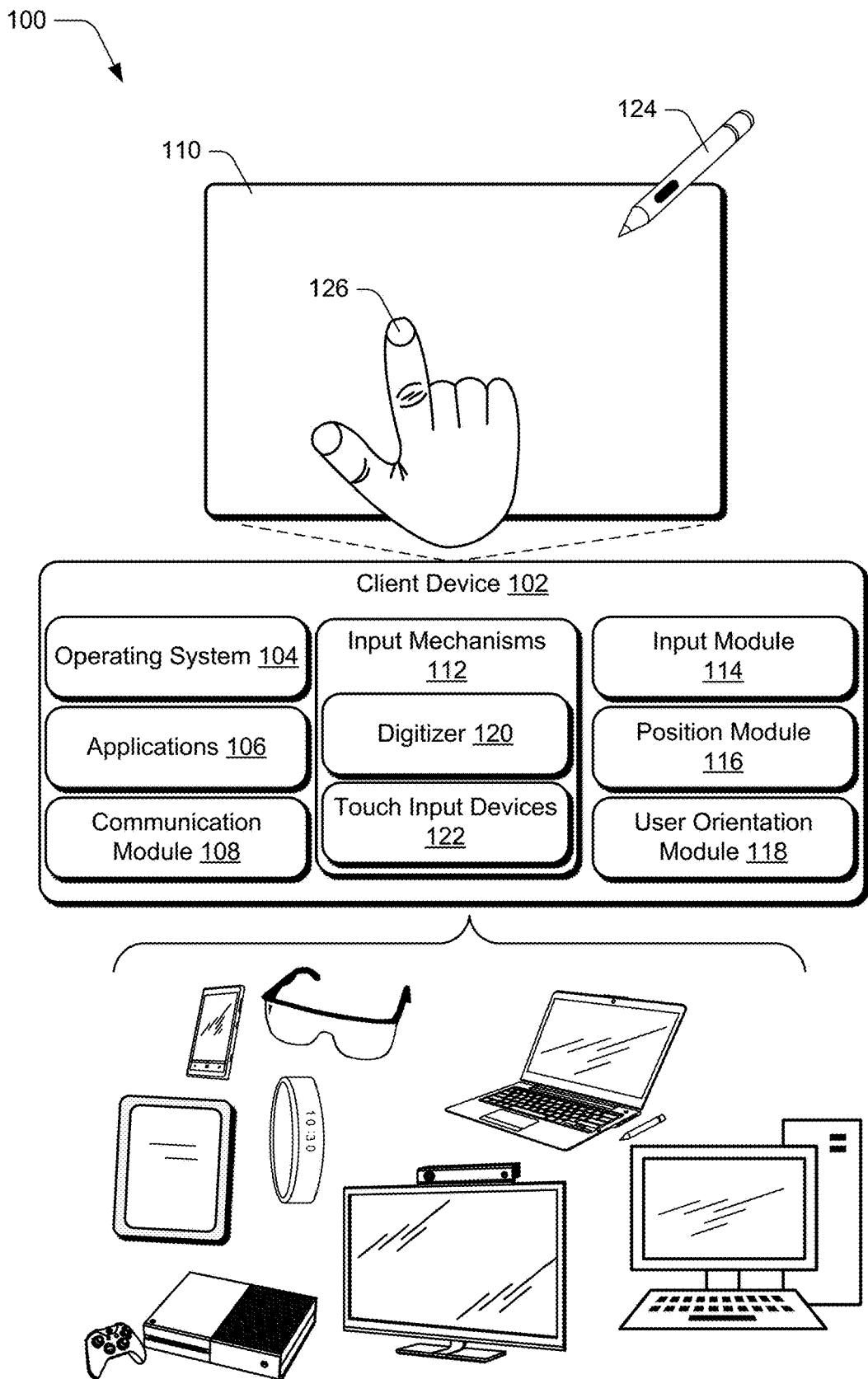
FIG. 1 is an illustration of an environment in an example implementation that is operable to employ techniques discussed herein in accordance with one or more embodiments.

FIG. 1 is an illustration of an environment 100 in an example implementation that is operable to employ techniques for input adjustment discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as an Internet of Things ("IoT") device. Thus, the client device 102 may range from a system with significant processing power, to a lightweight device with minimal processing power. One of a variety of different examples of a client device 102 is shown and described below in FIG. 12.

The client device 102 includes a variety of different functionalities that enable various activities and tasks to be performed. For instance, the client device 102 includes an operating system 104, applications 106, and a communication module 106. Generally, the operating system 104 is representative of functionality for abstracting various system components of the client device 102, such as hardware, kernel-level modules and services, and so forth. The operating system 104, for instance, can abstract various components (e.g., hardware, software, and firmware) of the client device 102 to the applications 106 to enable interaction between the components and the applications 106.

The applications 106 represents functionalities for performing different tasks via the client device 102. Examples of the applications 106 include a word processing application, a spreadsheet application, a web browser, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 106 is representative of functionality for enabling the client device 102 to communication over wired and/or wireless connections. For instance, the communication module 106 represents hardware and logic for communication via a variety of different wired and/or wireless technologies and protocols.

The client device 102 further includes a display device 110, input mechanisms 112, an input module 114, a position module 116, and a user orientation ("orientation") module 118. The display device 110 generally represents functionality for visual output for the client device 102. Additionally, the display device 110 represents functionality for receiving various types of input, such as touch input, pen input, and so forth. In at least one implementation, the display device 110 represents a single integrated display surface. Alternatively, and as further detailed below, the display device 110 can be implemented as multiple display surfaces that are interconnected via a hinge such that the display surfaces are pivotable relative to one another.

The input mechanisms 112 generally represent different functionalities for receiving input to the client device 102. Examples of the input mechanisms 112 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 112 may be separate or integral with the displays 110, with integral examples including gesture-sensitive displays with integrated touch-sensitive or motion-sensitive sensors. In this particular example, the input mechanisms 112 include a digitizer 120 and touch input devices 122. The digitizer 120 represents functionality for converting various types of input to the display device 110 and the touch input devices 122 into digital data that can be used by the client device 102 in various ways, such as for generating digital ink, touch input and gesture recognition, and so forth.

According to various implementations, the input module 114 represents functionality for performing various aspects of techniques for input adjustment discussed herein. For instance, the input module 114 can perform different visual and/or positional adjustments to input, such as ink input applied to the display device 110. Various functionalities of the input module 114 are discussed below. The position module 116 is representative of functionality to detect various postures and motion of the client device 102. For instance, the position module 116 includes hardware and logic for determining an orientation and/or position of the client device 102, such as with reference to gravity and/or other environmental reference point. The position module 116 includes and/or has access to different position and orientation-sensing hardware, such as an accelerometer, a gyroscope, geographic positioning system (GPS) hardware, and so forth.

The orientation module 118 is representative of functionality for determining a relative orientation and/or position of a user relative to the client device 102. The orientation module 118, for instance, includes and/or has access to different user position and orientation-sensing hardware, such as a camera, a microphone, biometric sensors, touch and grip position sensors, and so forth. As further detailed below, position and motion information from the position module 116, and user orientation information from the orientation module 118, can be leveraged to perform various input-related adjustments.

The environment 100 further includes a pen 124, which is representative of an input device for providing input to the display device 110. Generally, the pen 124 is in a form factor of a traditional pen but includes functionality for interacting with the display device 110 and other functionality of the client device 102. In at least some implementations, the pen 124 is an active pen that includes electronic components for interacting with the client device 102. The pen 124, for instance, includes a battery that can provide power to internal components of the pen 124.

Alternatively or additionally, the pen 124 may include a magnet or other functionality that supports hover detection over the display device 110. This is not intended to be limiting, however, and in at least some implementations the pen 124 may be passive, e.g., a stylus without internal electronics. Generally, techniques for input adjustment described herein can be implemented in combination with various types of input, such as input from the pen 124, from a user's finger 126, and/or any other suitable input mechanism.

Having described an example environment in which the techniques described herein may operate, consider now a discussion of an example implementation scenario in accordance with one or more embodiments.

Example Implementation Scenarios and Procedures

This section describes some example implementation scenarios and example procedures for input adjustment in accordance with one or more implementations. The implementation scenarios and procedures may be implemented in the environment 100 described above, the system 1200 of FIG. 12, and/or any other suitable environment. The implementation scenarios and procedures, for example, describe example operations of the client device 102. In at least some embodiments, steps described for the various procedures are implemented automatically and independent of user interaction.

Figure 2:
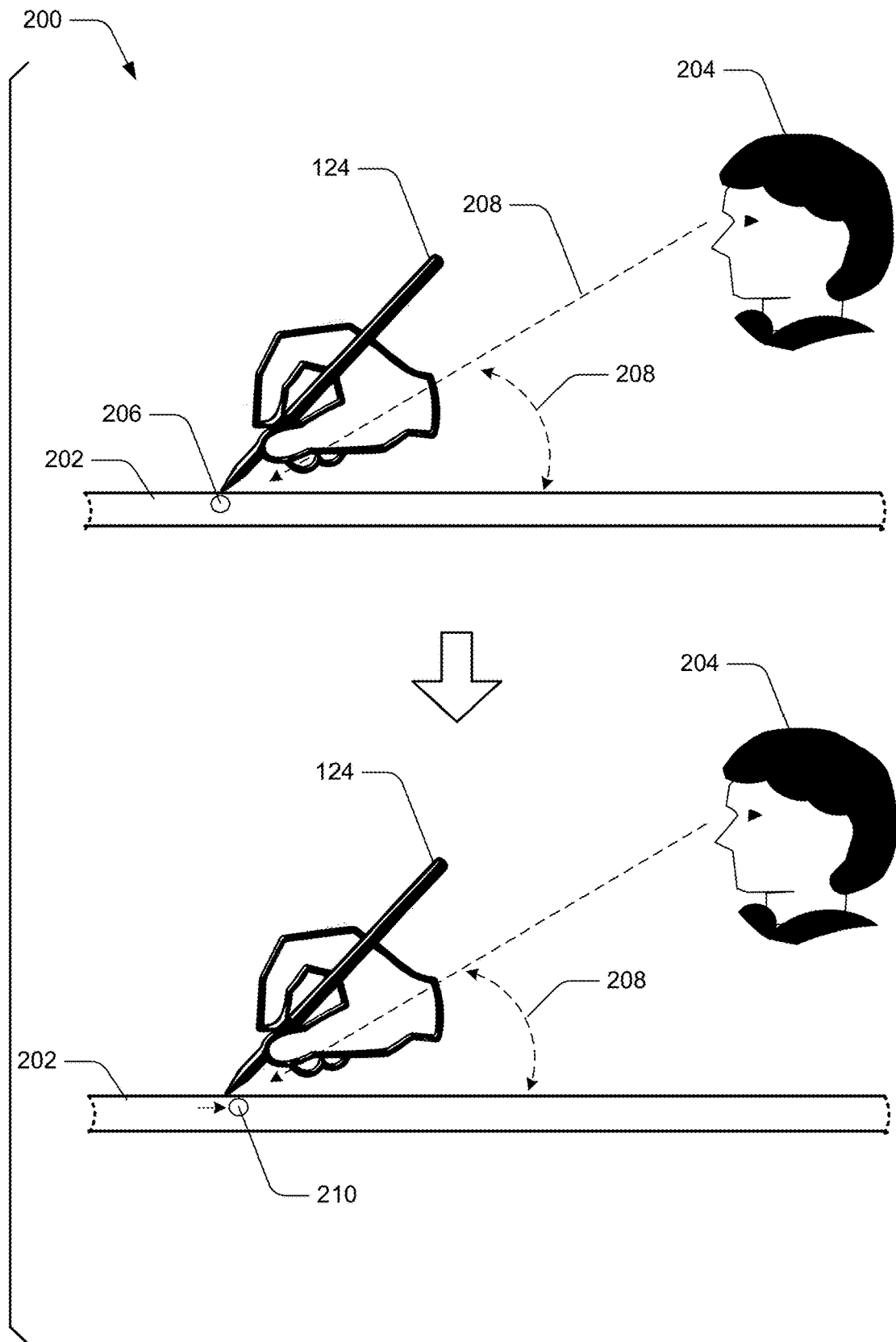
FIG. 2 depicts an example implementation scenario for determining an output location for outputting ink based on viewing angle in accordance with one or more embodiments.

FIG. 2 depicts an example implementation scenario 200 for determining an output location for outputting ink based on viewing angle in accordance with one or more implementations. The upper portion of the scenario 200 shows a partial side view of a display surface 202 of the display device 110. The display surface 202, for instance, represents a portion of the display device 110 that provides visual output and can receive input, such as using the pen 124. As part of the scenario 200, a user 204 brings the pen 124 in contact with the display surface 202, such as to enable the user to apply ink input to the display surface 202. The upper portion of the scenario 200 shows an input point 206 that represents a location on the display surface 202 where the pen 124 contacts the display surface 202.

Continuing with the scenario 200, the input module 114 determines a viewing angle 208 that corresponds to an angle at which that the user 204 is estimated to be viewing the display surface 202. Generally, the viewing angle 208 may be identified in various ways. For instance, the orientation module 118 may determine the viewing angle 208, such as via a camera within the client device 102 that detects an eye gaze angle of the user 204 and/or an orientation and distance of the user's face relative to the display surface 202.

Accordingly, and proceeding to the lower portion of the scenario 200, the input module 114 adjusts a position of the input point 206 to generate an adjusted input point 210. The adjusted input point 210, for instance, is closer to the user 204 than the original input point 206. Generally, the adjusted input point 210 represents a point at which input from the pen 124 will be displayed on the display surface 202.

According to various implementations, moving the input point 206 to the adjusted input point 210 enables the user 204 to view input from the pen 124 as being more closely correlated to the location on the display surface 202 where the pen 124 makes contact. For instance, the distance and/or viewing angle of the user 204 is such that without the adjusted input point 210, the user 204 may perceive input from the pen 124 as being visually disconnected from the tip of the pen 124. Thus, by generating and applying the adjusted input point 210, input from the pen 124 may appear to the user 204 as being more closely visually correlated to the tip of the pen 124 than input at the original input point 206. Further, the adjusted input point 210 may better correlate to the user's expectations and intent when using the pen 124 than does the input point 206.

Figure 3:
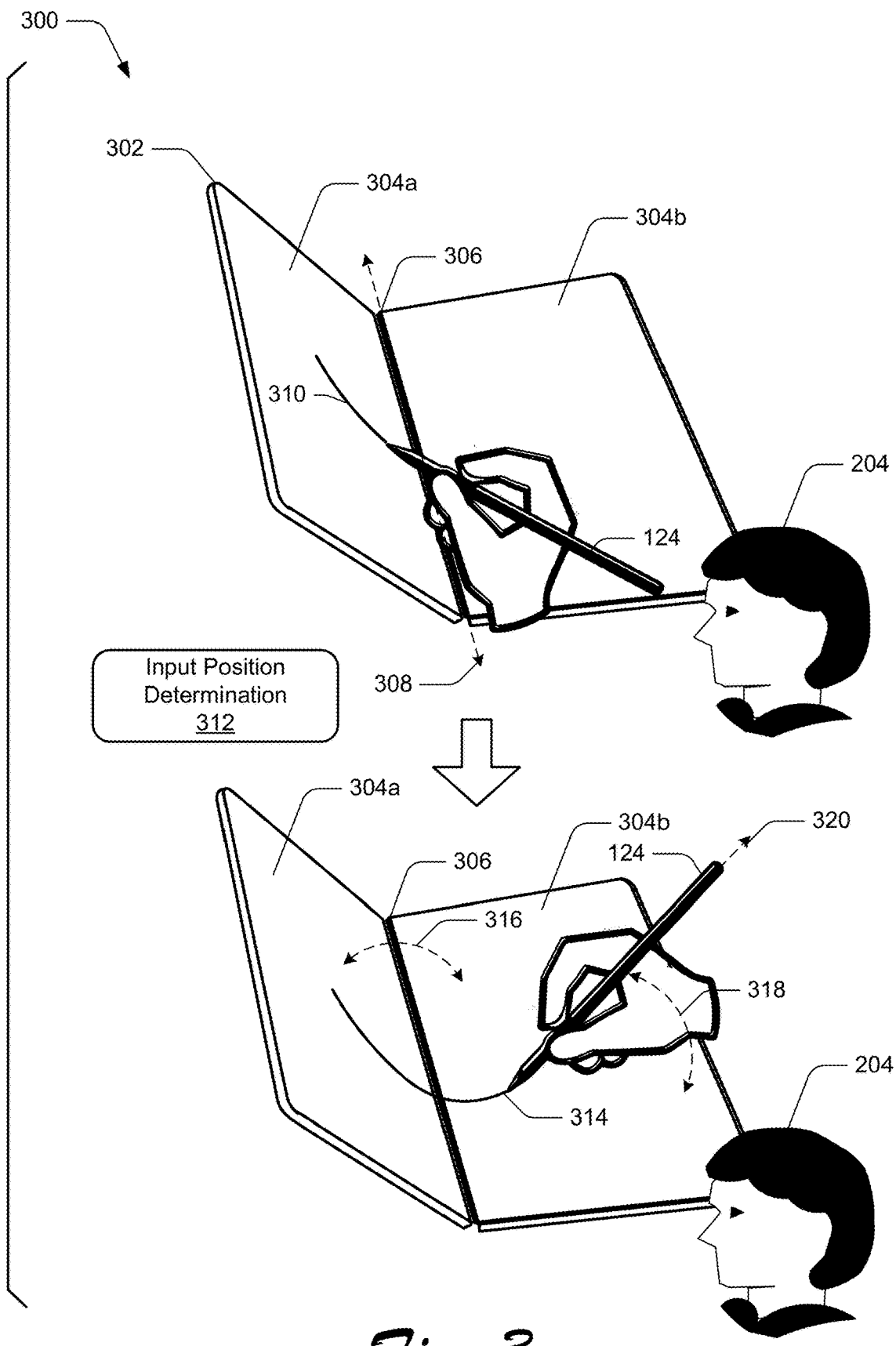
FIG. 3 depicts an example implementation scenario for determining a location for outputting ink in a hinged device in accordance with one or more embodiments.

FIG. 3 depicts an example implementation scenario 300 for determining a location for outputting ink in a hinged device in accordance with one or more implementations. The scenario 300 includes a client device 302, which generally represents an instance of the client device 102 introduced above. The client device 302 includes a display surface 304a and a display surface 304b connected via a hinge 306. The display surfaces 304a, 304b, for instance, represent different portions of the display device 110 introduced above. The hinge 306 is configured to rotationally move about a longitudinal axis 308 of the hinge 306 to allow an angle between the display surfaces 304a, 304b to change. In this way, the hinge 306 allows the display surfaces 304a, 304b to be connected to one another yet be oriented at different angles and/or planar orientations relative to each other.

In the upper portion of the scenario 300, the user 204 manipulates the pen 124 to begin applying ink input 310 to the display surface 304a. Proceeding to the lower portion of the scenario 300, the ink input 310 proceeds across the hinge 306 and onto the display surface 304b. Accordingly, the input module 114 performs input position determination 312 which determines a position 314 for displaying the ink input 310 on the display surface 304b. The position 314 is generally based on an hinge angle 316 of the display surfaces 304a, 304b relative to one another.

For instance, to enable the position 314 to be determined, the position module 116 determines the hinge angle 316. Generally, the hinge angle 316 may be determined in various ways. For instance, the position module 116 may include a hinge sensor that detects an angular orientation of the display surfaces 304a, 304b based on a rotational orientation of the hinge 306. Alternatively or additionally, the position module 116 can determine a respective orientation of the individual display surfaces 304a, 304b, such as based on gravity-based orientation determined via an accelerometer, gyroscope, or other suitable technique. The position module 116 can then determine an orientation of the display surfaces 304a, 304b relative to one another by comparing their relative gravitational orientation. Of course, a variety of other techniques can be employed to determine the hinge angle 316.

Using the hinge angle 316, the input module 114 can generate the position 314 for the ink input 310 on the display surface 304b, such as to attempt to visually correlate the tip of the pen 124 with the position of the ink input 310. For instance, consider that a threshold angle n is defined. If the hinge angle 316 is less than n, the position 314 can be moved closer on the display surface 304b to the user 204.

Additionally or alternatively to using the hinge angle 316, a pen angle 318 of the pen 124 relative to the display surface 304b can be used to determine the position 314. The pen angle 318, for instance, represents an angle of a longitudinal axis 320 of the pen 124 relative to the planar surface of the display surface 304b. The pen angle 318 may be determined in various ways, such as based on a distance of a known point on the pen 124 from the display surface 304b. Alternatively or additionally, the pen angle 218 may be determined based on a distance of a known point on the pen 124 (e.g., the same known point mentioned above or a different known point) from the display surface 304a. In scenarios where the hinge 306 is bent, this distance information can provide useful positional data in multiple dimensions.

In an example implementation, consider that a threshold angle p is defined for the pen 124. If the pen angle 318 is less than p, the position 314 can be moved closer to the user 204 than the actual point of contact of the pen 124 on the display surface 304b. For instance, the shallower the pen angle 318, the more likely that portions of the pen 124 may obscure the ink input 310. Thus, moving the position 314 closer to the user 204 may enable the ink input 310 to appear more closely correlated to the tip of the pen 124 than if the ink input 310 were displayed directly below a point of contact of the tip of the pen 124 on the display surface 304b. Accordingly, techniques described herein can move a position of output resulting from input to an input surface and based on an angle of an input instrumentality (e.g., the pen 124, a user's finger, and so forth) to cause the output to be more visually correlated with the input instrumentality.

Additionally or alternatively to the hinge angle 316 and/or the pen angle 318, a viewing angle of the user 204 can be considered for determining the position 314. The scenario 200, for instance, can be combined with the hinge angle 316 and/or the pen angle 318 to calculate the position 314.

Figure 4:
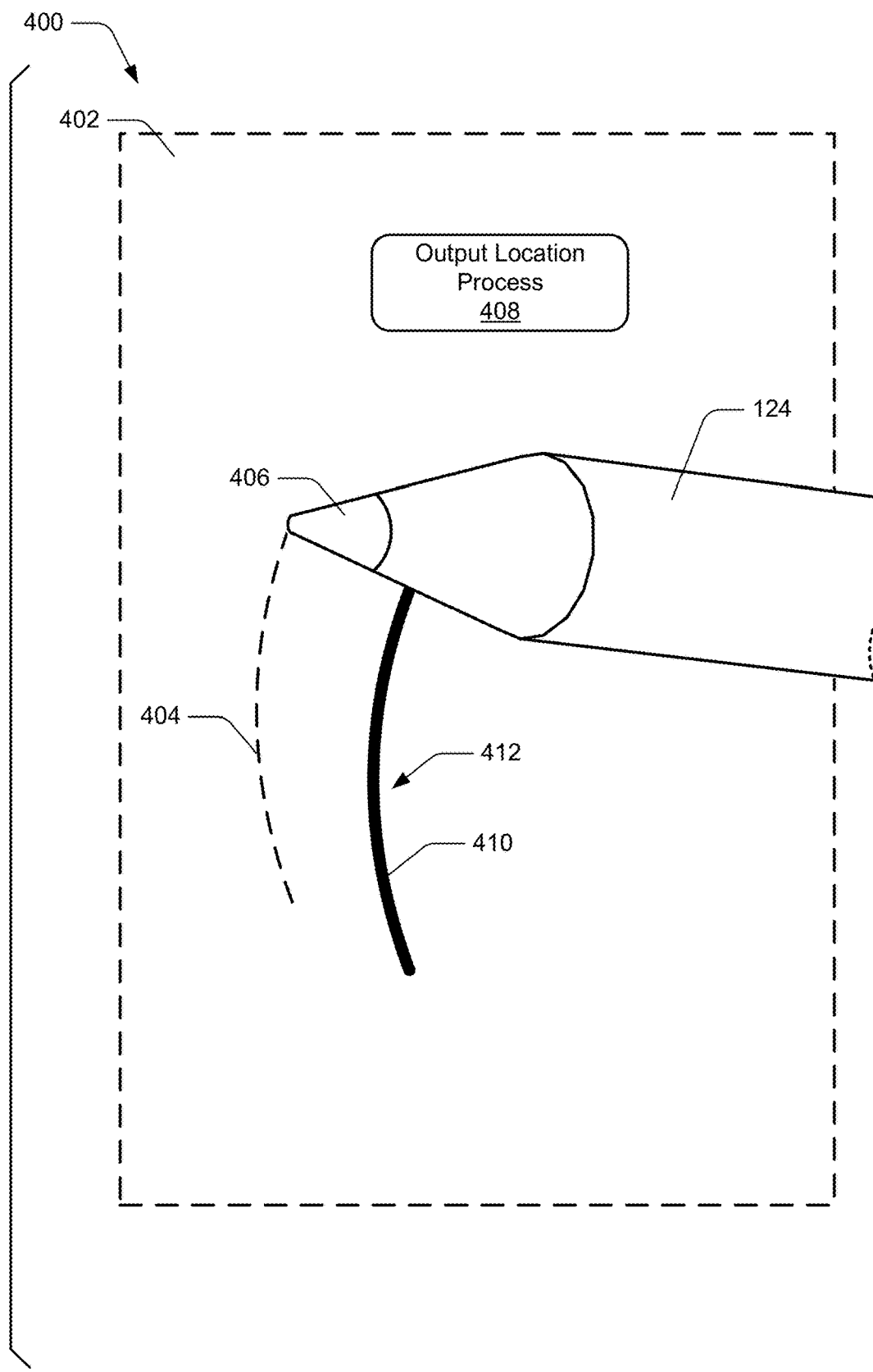
FIG. 4 depicts an example implementation scenario for determining an output location for outputting ink to correlate the ink to an estimated user perspective of an input location in accordance with one or more embodiments.

FIG. 4 depicts an example scenario 400 for determining an output location for outputting ink to correlate the ink to an estimated user perspective of an input location in accordance with one or more implementations. In the scenario 400, a user manipulates the pen 124 to apply input to an input surface 402 of the display device 110. A dashed line indicates an input path 404 where contact between a tip 406 of the pen 124 and the surface 402 occurs as part of the input. However, based on an output location process 408, ink output 410 is output at an output location 412 that is different than the input path 404. Generally, the output location process 408 determines the output location 412 based on one or more factors discussed above, such as user viewing angle, tilt angle of the surface 402, angle of the pen 124 relative to the surface 402, and/or angle the surface 402 relative to a different output surface, such as in a multi-display device scenario.

In at least one implementation, the output location process 408 determines the output location 412 as a pixel shift from the input path 404. The output location 412, for instance, is specified as p pixels from the input path 404 and/or the tip 406, where p represent an (x, y) pixel offset from the input path 404.

The output location 412 is not necessarily to scale, and is depicted as shown in the scenario 400 for purpose of illustration only.

Figure 5:
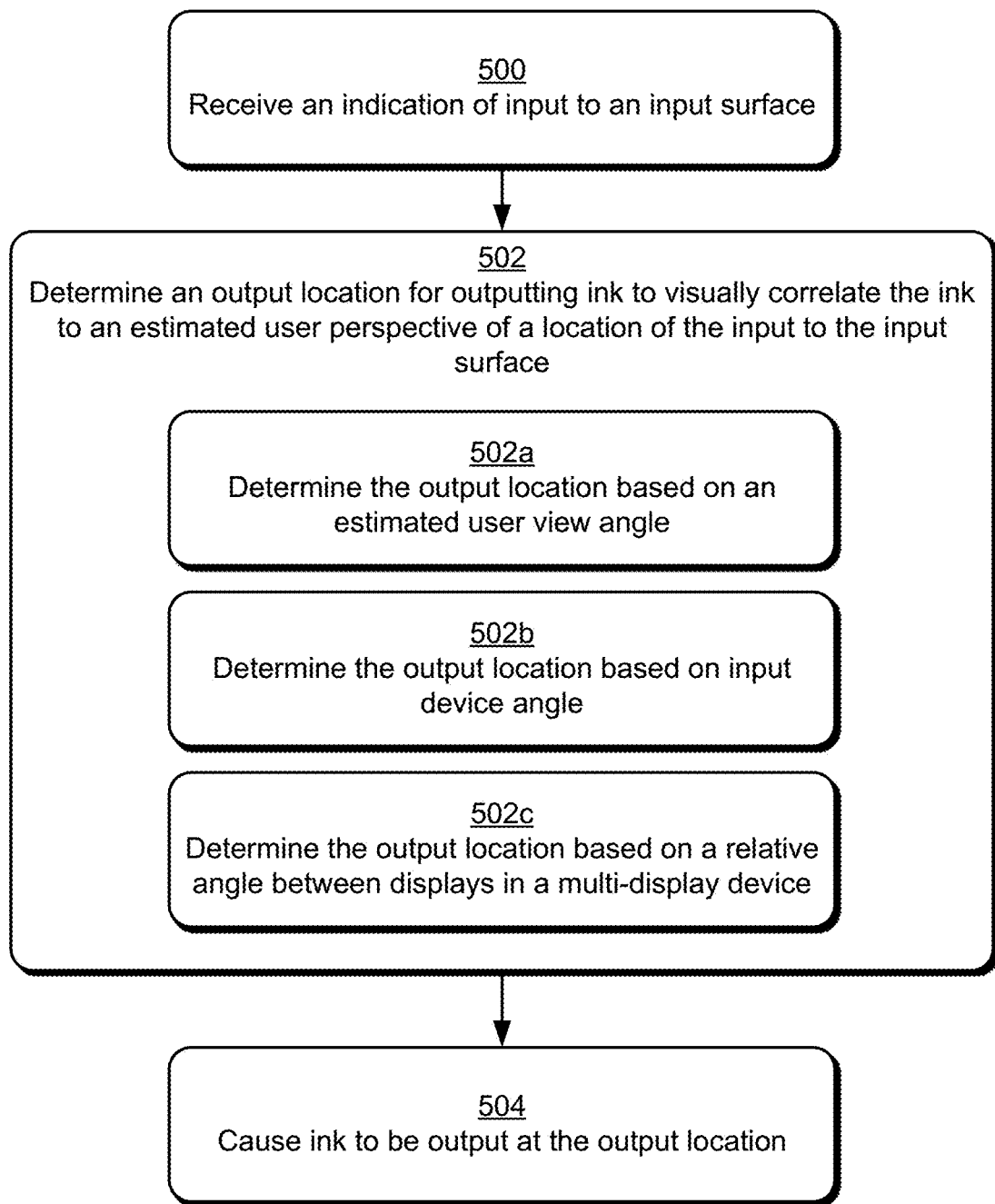
FIG. 5 is a flow diagram that describes steps in a method for determining an output location for ink in accordance with one or more embodiments.

FIG. 5 is a flow diagram that describes steps in a method in accordance with one or more implementations. The method describes an example way for determining an output location for ink.

Step 500 receives an indication of input to an input surface. The input module 114, for instance, determines that input is received at the display device 110. The input may be received in various ways, such as via the pen 124, a user's finger, a stylus, and/or other suitable input mechanism.

Step 502 determines an output location for outputting ink to visually correlate the ink to an estimated user perspective of a location of the input to the input surface. Different ways of determining an output location to visually correlate with a user's perspective are discussed above, and include:

Determine the output location based on an estimated user view angle (Step 502a). A user's viewing angle can be estimated in various ways, such as using gaze detection, device grip detection, estimating a user's distance from a display surface, and so forth.

Determine the output location based on input device angle (Step 502b). An angle of a pen and/or a user's finger relative to an input surface (e.g., a display surface), for instance, can be estimated.

Determine the output location based on a relative angle between displays in a multi-display device (Step 502c). For instance, an angle between display surfaces of a multi-screen device can be used, such as based on a hinge angle of a hinge that connects the display surfaces.

Depending on the scenario, these different example ways of determining an output location can be used individually or in combination.

Step 504 causes digital ink to be output at the output location. The input module 114, for instance, communicates the output location to the operating system 104, which uses the output location to output ink on the display device 110. In at least one implementation, the output location can be specified as a pixel offset value (e.g., x offset and/or y offset) to be applied to a detected input location for outputting ink.

Figure 6:
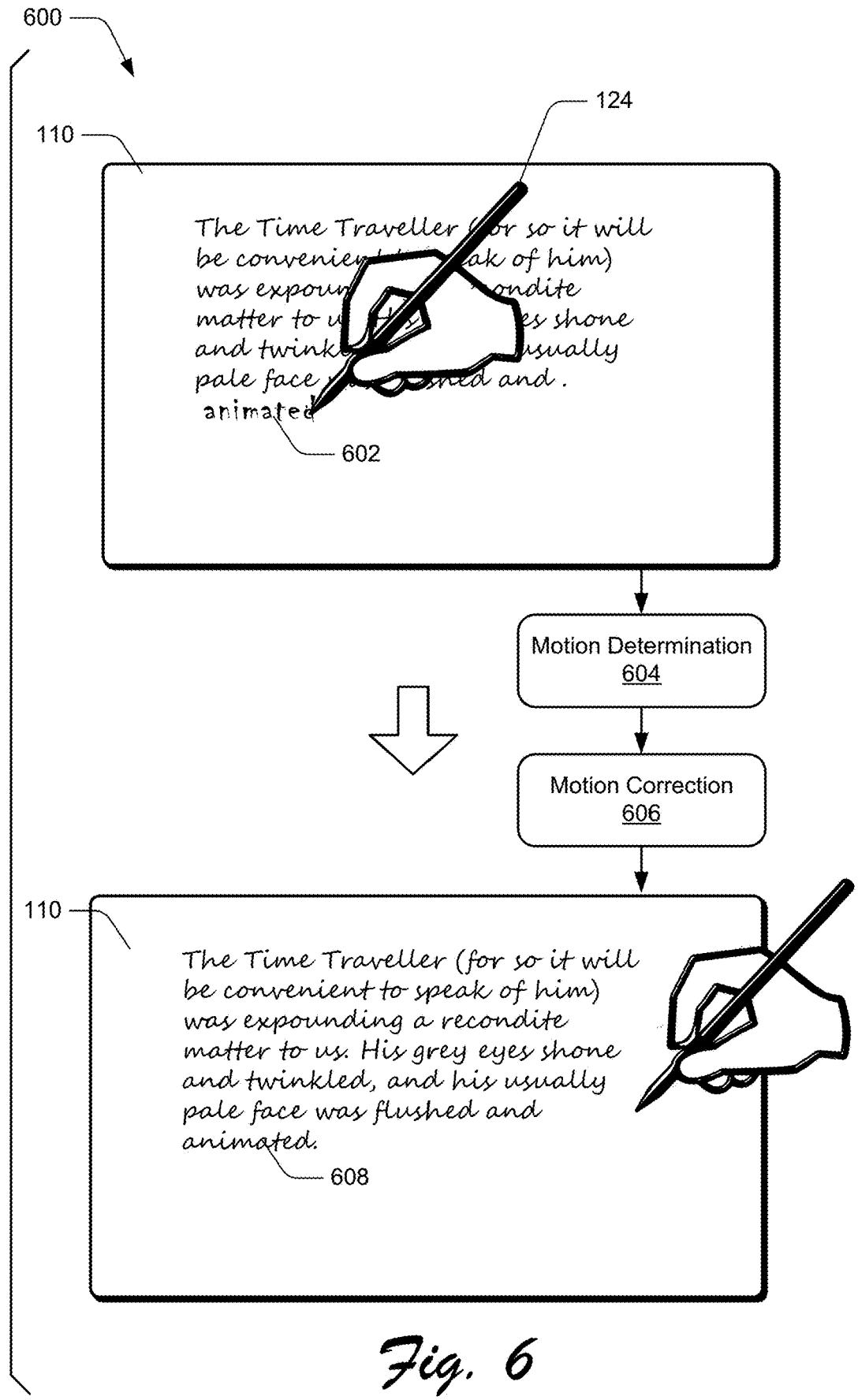
FIG. 6 depicts an example implementation scenario for applying motion correction to ink input in accordance with one or more embodiments.

FIG. 6 depicts an example scenario 600 for applying motion correction to ink input. In the upper portion of the scenario 600, a user manipulates the pen 124 to apply ink input 602 on the display device 110. Further, the position module 116 performs motion determination 604 for the display device 110. Generally, the motion determination 604 represents determining a direction and amount of movement of the display device 110 over time. In at least one implementation, the motion determination 604 detects vibration of the display device 110. Alternatively or additionally, the motion determination 604 includes detecting motion of a user holding the display device 110. For example, motion errors introduced in situations where the user and display device 110 move together may be different than those introduced in situations where only the display device 110 is moving, or the user and the display device 110 are moving in uncorrelated ways.

Further to the scenario 600, the input module 114 determines motion correction 606 to be applied to the ink input 602. The motion correction 606, for instance, represents motion compensation to be used to reduce an effect that the detected motion has on the ink input 602. In at least one implementation, the motion correction 606 includes pixel compensation values to be used to move the ink input 602 to compensate for the detected motion. Alternatively or additionally, the motion correction 606 indicates that the ink input 602 is to be modified to match a known handwriting style of a user. For instance, based on character analysis performed on past ink input from the user, the user's handwriting style can be characterized. Thus, the motion correction 606 can specify that the ink input 602 is to be corrected to match the user's handwriting style.

Accordingly, the input module 114 applies the motion correction 606 to generate corrected ink output 608. The ink input 602, for instance, is modified to generate the corrected ink output 608. For example, the corrected ink output 608 removes errant variations in ink strokes of the ink input 602 to produce the corrected ink output 608. Additionally or alternatively, the corrected ink output 608 represents a modification of the ink input 602 to match a known handwriting style of a user.

Figure 7:
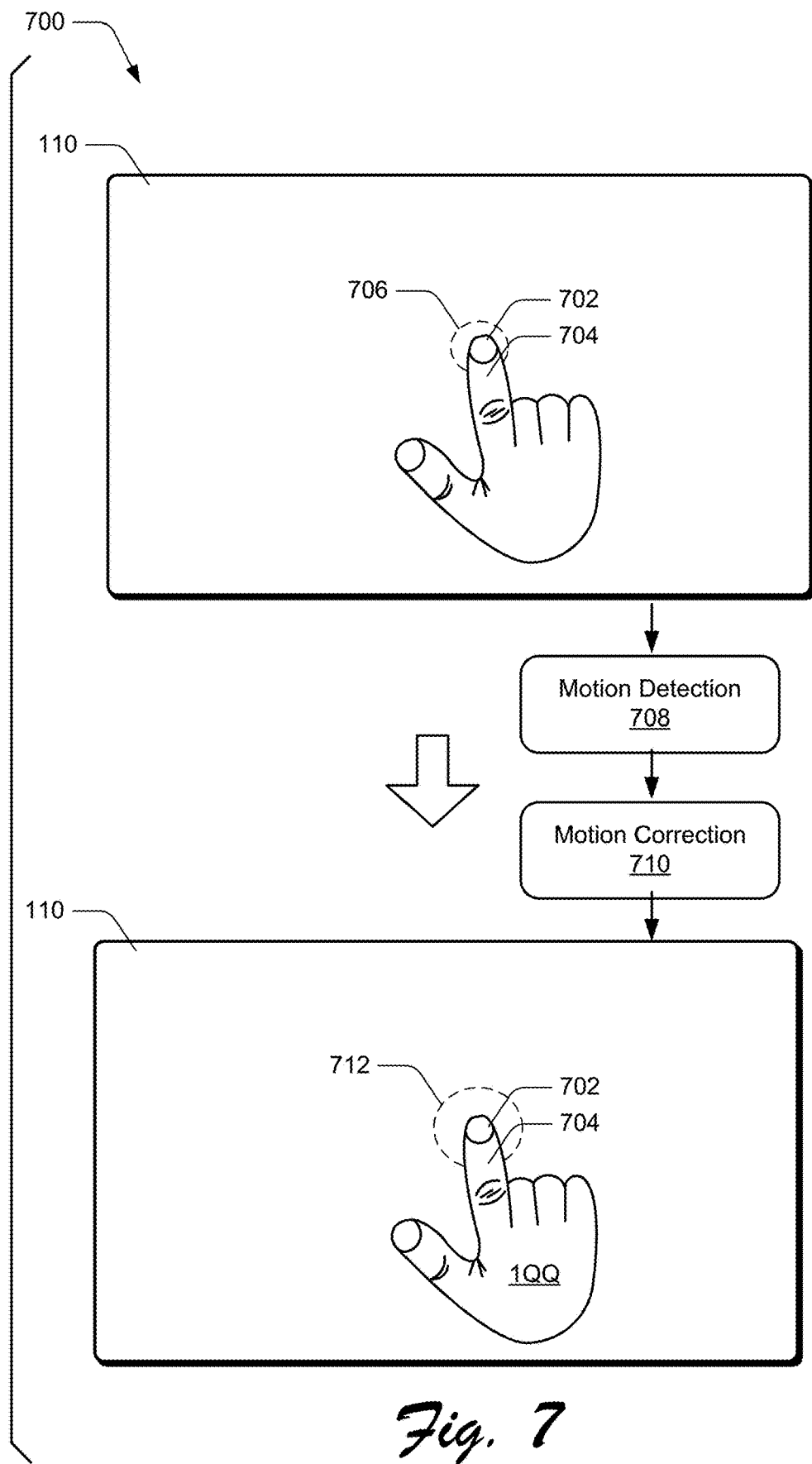
FIG. 7 depicts an example implementation scenario for applying motion correction to input detection in accordance with one or more embodiments.

FIG. 7 depicts an example scenario 700 for applying motion correction to input detection. The upper portion of the scenario 700 illustrates a user applying touch input 702 to the display device 110 using a finger 704. Shown around the touch input 702 is an input zone 706, which corresponds to a region around the touch input 702 that is used in defining an input function from the touch input 702. According to various implementations, the input zone 706 is not visually distinguished from other portions of the display device 110, but represents a logically-defined portion of the display device 110. For instance, consider that the touch input 702 represents two consecutive taps on the display device 110 within a specific period of time, e.g., 500 milliseconds. If both taps occur within the input zone 706, the input module 114 will interpret the touch input 702 as a double tap gesture and thus generate an input signal representing the double tap gesture. However, if one of the taps occurs within the input zone 706, and the other occurs outside of the input zone 706, the touch input 702 will not be interpreted as a double tap gesture. In this case, for instance, the touch input 702 will be interpreted as two separate single tap gestures. Thus, techniques described herein enable the input zone 706 to be dynamically configurable based on various environmental factors, such as detected motion of the display device 110.

For instance, the position module 116 performs motion detection 708 for the display device 110. Generally, the motion detection 708 represents determining a direction and distance of movement of the display device 110 over a discrete period of time. In at least some implementations, the motion detection 708 can sum multiple small movements of the display device 110 and/or a user holding the display device 110 over a period of time, and/or mathematically characterize the movement. The motion detection 708, for instance, attempts to disambiguate a situation where there is no motion from one where the display device 110 moves back and forth quickly within a discrete period of time. In at least some implementations, the position module 116 can periodically perform the motion detection 708, such as every m milliseconds. Thus, the motion detection 708 can indicate direction and distance of movement of the display device 110 over consecutive time intervals.

In at least one implementation, the motion detection 708 distinguishes between intended movement of the display device 110, and unintended movement. For instance, intended movement of the display device 110 occurs when a user is in motion while carrying the client device 102, such as while walking or being conveyed via a form a transportation. Unintended movement may occur due to incidental vibrations and other movements that occur due to the mechanics of walking or movement via transportation. Thus, the motion detection 708 can calculate a total motion vector for the display device and subtract out an intended motion portion of the motion vector to determine which portion of the total motion vector represents unintended motion. Unintended motion may then be used to perform various forms of motion-based adjustment and compensation discussed throughout this disclosure.

In this particular scenario, the motion detection 708 indicates that the display device 110 moves more than a threshold amount. The motion detection 708, for instance, indicates that movement of the display device 110 exceeds a movement threshold defined as distance/time, d/t. Accordingly, and as shown in the lower portion of the scenario 700, the input module 114 performs a motion correction 710 to cause the input zone 706 to be adjusted to account for motion detected by the motion detection 708 to generate an adjusted input zone 712. The adjusted input zone 712, for instance, is larger than the original input zone 706. By increasing the size of the input zone 706, the user is given a larger target zone for providing the touch input 702. This increases the likelihood that the user's intent for the touch input 702 will be correctly interpreted by the input module 114. For instance, where the touch input 702 represents two consecutive taps (as described above), as long as both taps are within the adjusted input zone 712, the touch input 702 will be recognized as a double tap gesture. While the scenario 700 is discussed with reference to a double tap gesture, it is to be appreciated that the scenario can be employed with a variety of different gestures, such as gestures that utilize a timing component for gesture recognition.

In at least some implementations, the adjusted input zone 712 is generated by increasing the size of the input zone 702. The input zone 702, for instance, is symmetrically expanded in all directions to generate the adjusted input zone 712. In an alternative or additional implementation, however, the input zone 702 can be adjusted in a particular direction to compensate for motion in the particular direction. Consider, for instance, the following example scenario.

Figure 8:
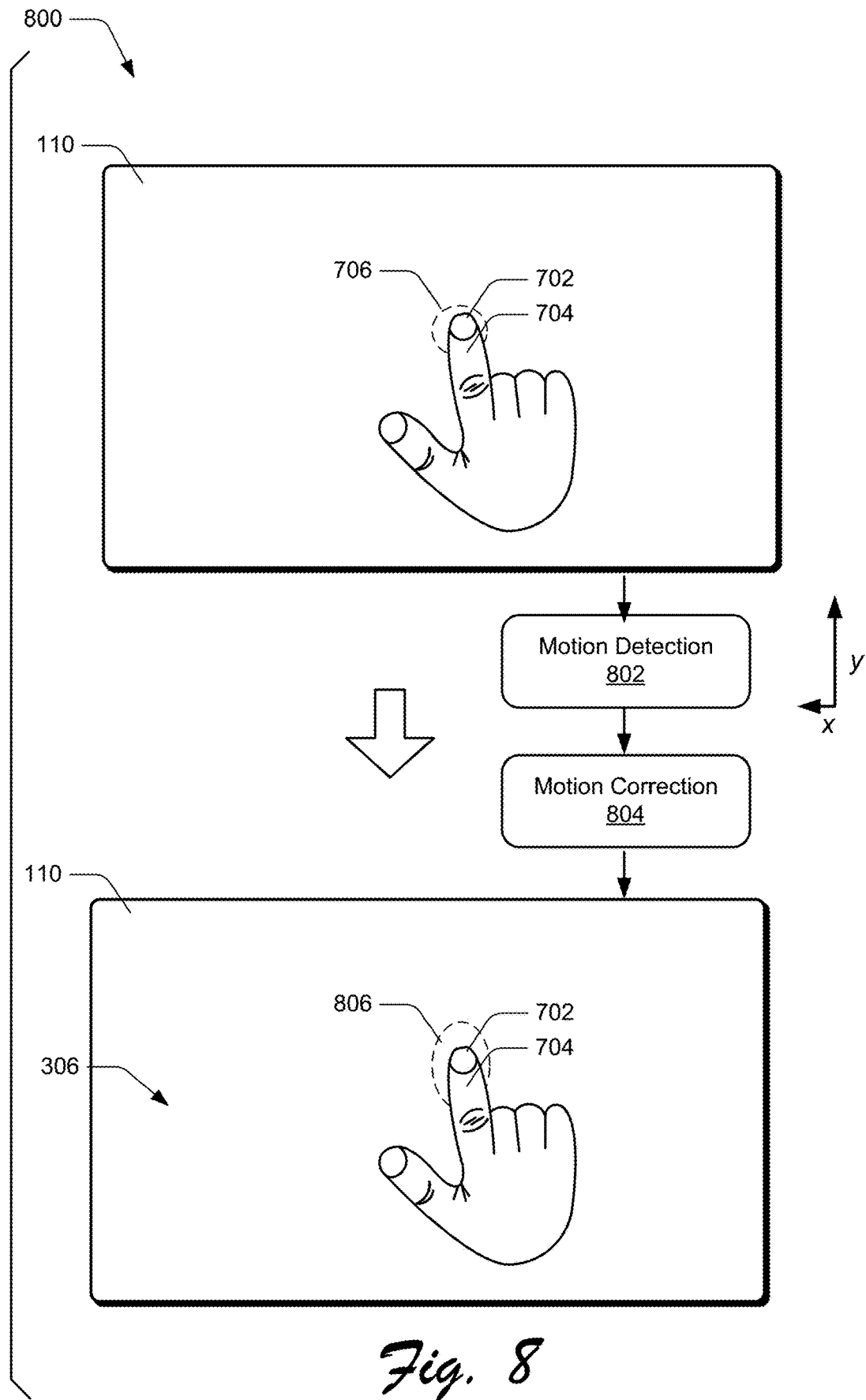
FIG. 8 depicts an example implementation scenario for applying asymmetrical motion correction to input detection in accordance with one or more embodiments.

FIG. 8 depicts an example scenario 800 for applying asymmetrical motion correction to input detection. The scenario 800, for example, represents a variation on the scenario 700, above.

In the scenario 800, the user applies the touch input 702 to the display device 110. Further, the input zone 706 is shown around the touch input 702, such as described above. The position module 116 performs motion detection 802, which in this scenario indicates that movement of the display device exceeds a threshold amount of movement in a y direction. A motion vector $v_m$ generated by the motion detection 802, for instance, indicates that motion of the display device 110 in they direction exceeds a threshold distance/time, and that movement in they direction is greater than movement of the display device 110 in the x direction.

Accordingly, the input module 114 performs a motion correction 804 to generate an adjusted input zone 806. Notice that in this particular example, the adjusted input zone 806 is generated by expanding the original input zone 702 in the y direction. In at least one implementation, the adjusted input zone 806 may be generated by expanding the input zone 702 to a lesser extent in the x direction than in the y direction, or by not expanding the input zone in the x direction. Thus, the adjusted input zone 806 is generated by asymmetrically adjusting the input zone 702. The input zone 806, for instance, is expanded in the y direction since excess movement in they direction is detected. This provides the user with a greater input area in which to provide the touch input 702 and decreases the likelihood that the excess movement in the y direction will cause the touch input 702 to be incorrectly interpreted by the input module 114.

Figure 9:
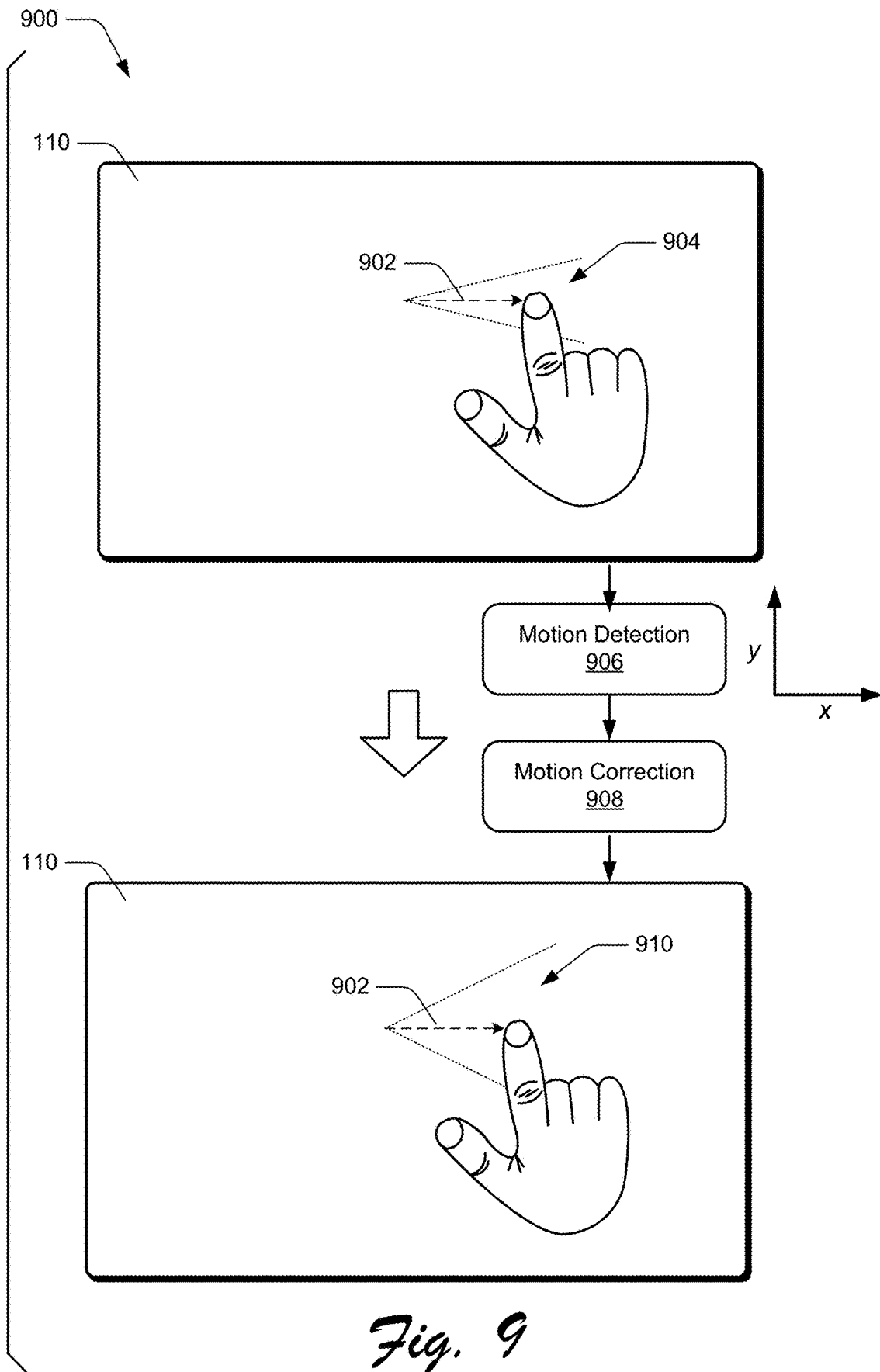
FIG. 9 depicts an example implementation scenario for adjusting an input zone for a swipe gesture in accordance with one or more embodiments.

FIG. 9 depicts an example scenario 900 for adjusting an input zone for a swipe gesture. In the upper portion of the scenario 900, a user applies a swipe gesture 902 to the display device 110. Illustrated around the swipe gesture 902 is an input zone 904, which corresponds to a region around the swipe gesture 902 that is used in defining an input function from the swipe gesture 902. For instance, if the swipe gesture 902 occurs within the input zone 904, the input module 114 will interpret the swipe gesture 902 as a swipe in the x direction, e.g., a swipe right gesture. If the swipe gesture 902 crosses out of the input zone 904, however, the input module 114 will not interpret the swipe gesture 902 as a swipe in the x direction. The input module 114, for instance, will interpret the swipe gesture 902 as a swipe in the y direction.

Further to the scenario 900, the position module 116 performs motion detection 906, which indicates that movement of the display device 110 exceeds a threshold amount of movement. A motion vector $v_m$ generated by the motion detection 906, for instance, indicates that motion of the display device 110 exceeds a threshold distance/time. Generally, the movement may be in a particular direction (e.g., the x direction or the y direction), or may represent a cumulative movement in multiple directions.

Accordingly, and based on the motion detection 906, the input module 114 performs a motion correction 908 to generate an adjusted input zone 910. As shown, the adjusted input zone 910 is expanded as compared to the original input zone 904. For instance, a width of at least a portion of the input zone 910 is expanded. Thus, if the swipe gesture 902 remains within the adjusted input zone 910, the swipe gesture 902 will be interpreted as a swipe in the x direction. Thus, by generating the adjusted input zone 904, a likelihood that incidental motion of the display device 110 will cause the swipe gesture 902 to be incorrectly interpreted is reduced.

Figure 10:
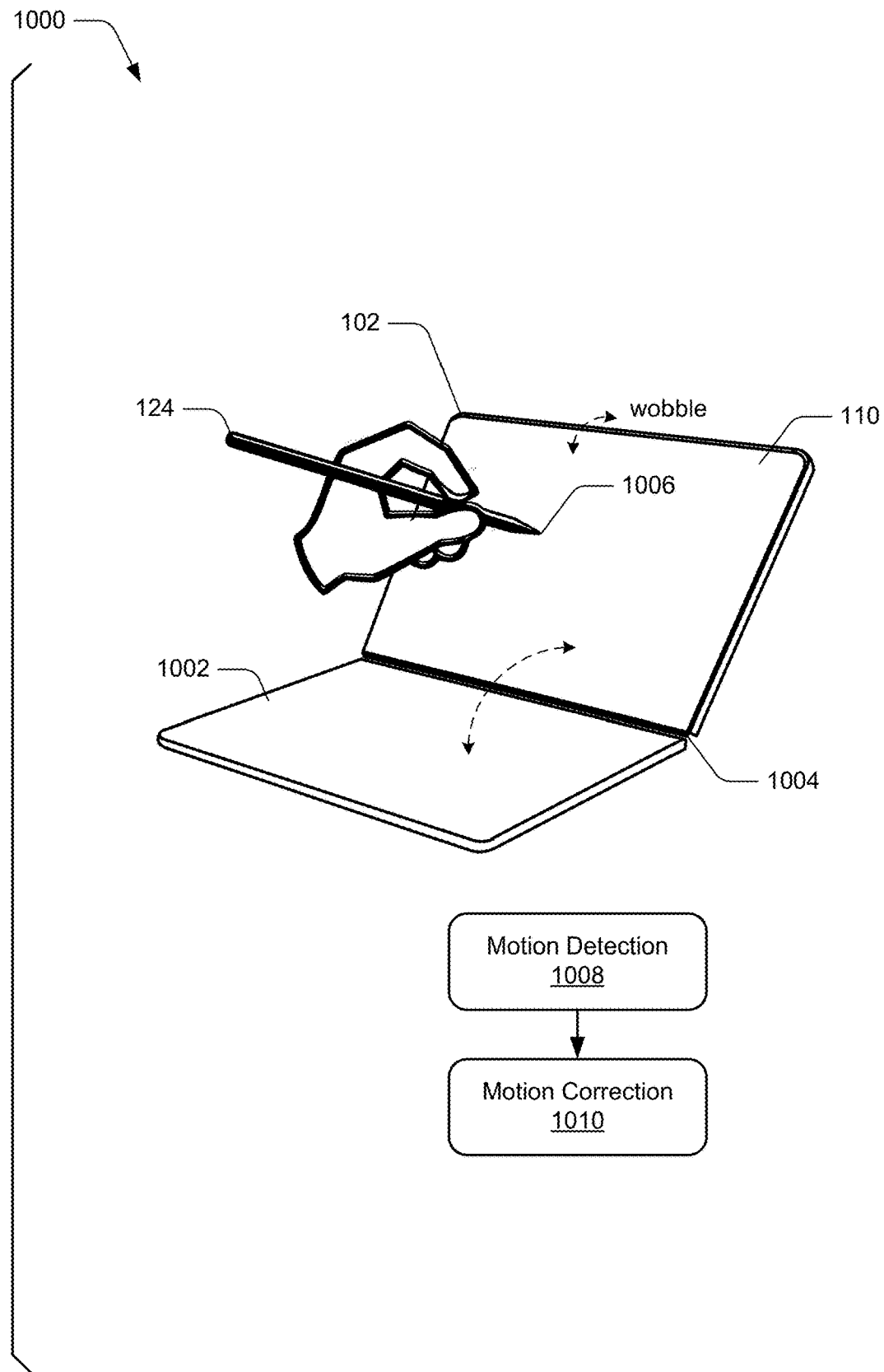
FIG. 10 depicts an example implementation scenario for motion correction for screen wobble in accordance with one or more embodiments

FIG. 10 depicts an example scenario 1000 for motion correction for screen wobble. In the scenario 1000, the client device 102 is implemented as a hinged device, such as a laptop or a dual-screen device. For instance, the display device 110 is attached to a device body 1002 via a hinge 1004. The device body 1002 may be implemented in various ways, such as a keyboard, a touch input device, a separate display device, and so forth. Generally, the hinge 1004 enables the display device 110 to be pivoted relative to the device body 1002 and held at different angles relative to the device body 1002 to support different usage scenarios.

Further to the scenario 1000, a user provides input 1006 to the display device 110 using the pen 124. The input 1006, for instance, represents the user applying ink on the display device 110, and/or the user selecting or manipulating content displayed on the display device 110. The input 1006 causes the display device 110 to wobble relative to the device body 1002. The action of the hinge 1004, for instance, is spring-like (e.g., elastic) such that the input 1006 causes the display device 110 to wobble on the hinge 1004, but does not cause a repositioning of the display device 110 relative to the device body 1002. Accordingly, the input module 114 performs motion detection 1008, which detects the wobble motion. Based on the motion detection 1008, the input module 114 performs motion correction 1010 to the input 1006. The motion correction 1010, for instance, represents one or more different types of motion correction discussed above, such as motion correction of ink input, adjustment of an input zone, and so forth. While the motion correction 1010 considers the motion detection 1008, it may consider other factors as well, such as angle of the pen 124 relative to the display device 110, estimated viewing angle of a user relative to the display device 110, an estimated angle of the display device 110 relative to the device body 1002, and so forth.

Thus, implementations described herein enable various input-associated corrections to be applied to compensate for different environmental and device-based factors. The different gestures and input scenarios described above are presented for purpose of example only, and it is to be appreciated that techniques described herein can be employed in a variety of different input scenarios and with a variety of different gestures not explicitly described herein.

Figure 11:
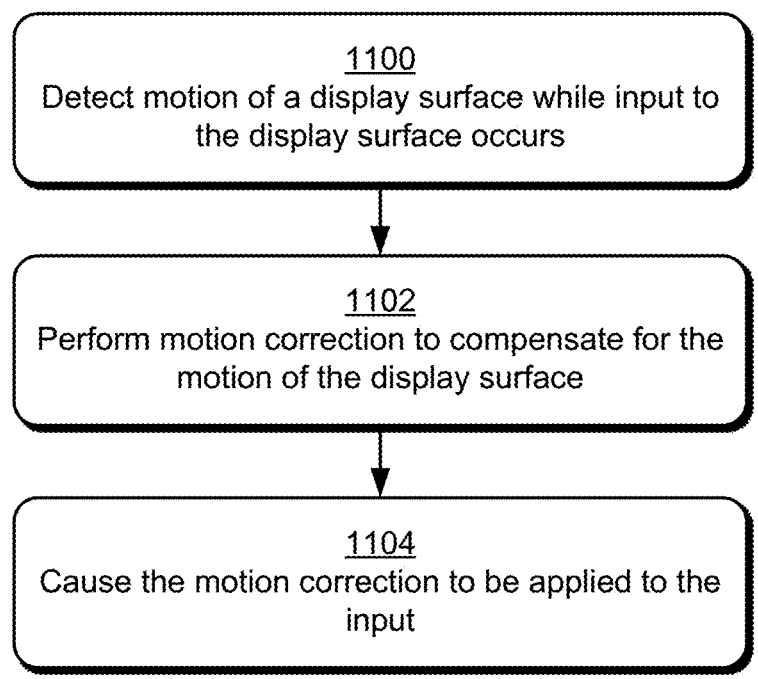
FIG. 11 is a flow diagram that describes steps in a method for performing motion correction for input in accordance with one or more embodiments

FIG. 11 is a flow diagram that describes steps in a method in accordance with one or more embodiments. The method, for instance, describes an example procedure for performing motion correction for input.

Step 1100 detects motion of a display surface while input to the display surface occurs. The position module 116, for instance, detects motion of the display device 110 in one or more directions while a user is providing input to the display device 110.

Step 1102 calculates a motion correction to compensate for the motion of the display surface. For example, the input module 114 determines how to correct the input, such as how to adjust ink input, how to adjust an input zone, and so forth.

Step 1104 causes the motion correction to be applied to the input. The motion correction may be applied in various ways, examples of which are discussed above. For instance, the motion correction can be applied to correct input. As another example, the motion correction can be applied to adjust an input zone used to recognize different types of input, such as specific gesture-based input.

Although discussed separately, it is to be appreciated that the implementations, scenarios, and procedures described above can be combined and implemented together in various ways. For instance, the procedures and scenarios described above can be implemented in conjunction to compensate for both user perspective and device motion.

Having described some example implementation scenarios and procedures for input adjustment, consider now a discussion of an example system and device in accordance with one or more embodiments.

Example System and Device

Figure 12:
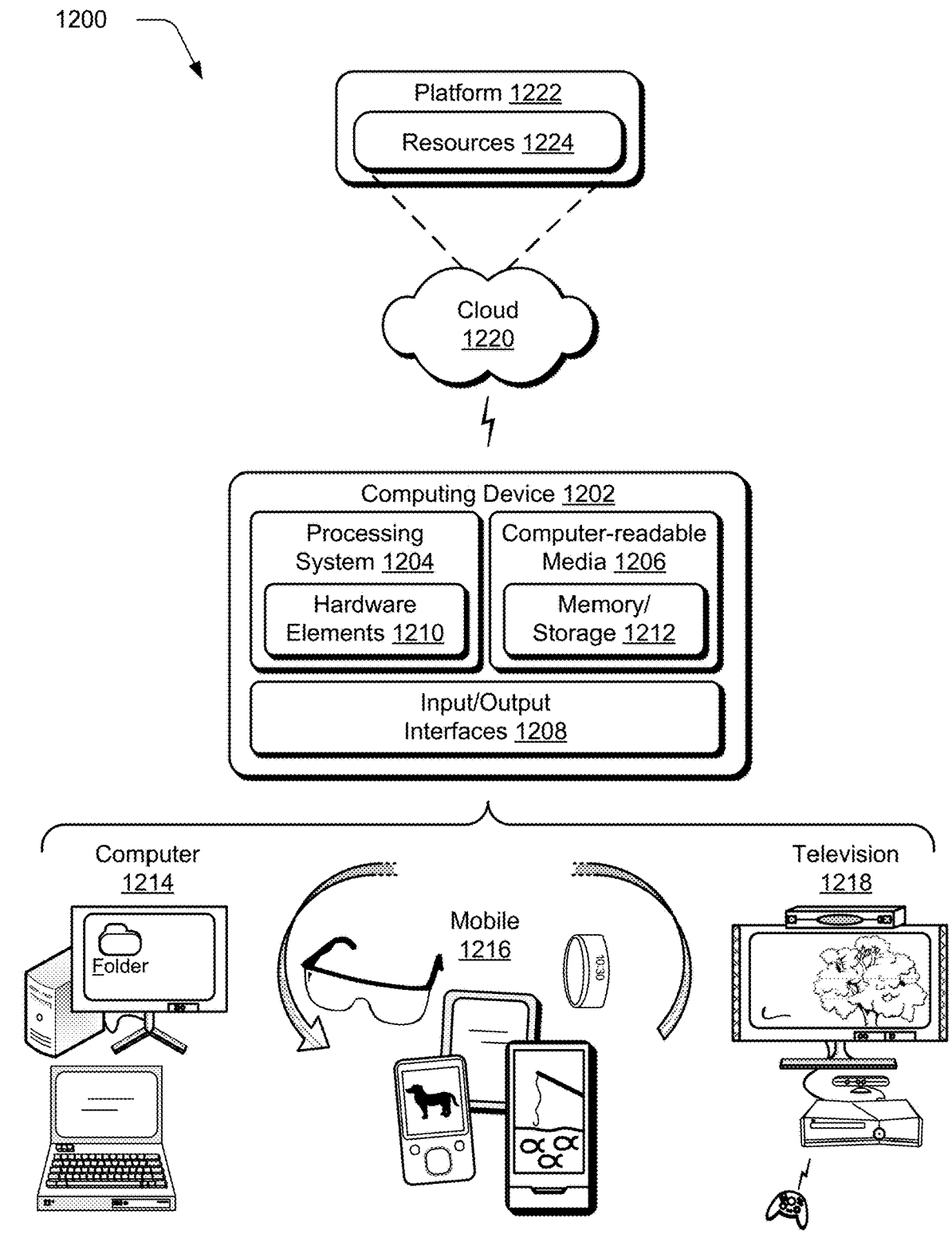
FIG. 12 illustrates an example system and computing device as described with reference to FIG. 1, which are configured to implement embodiments of techniques described herein.

FIG. 12 illustrates an example system generally at 1200 that includes an example computing device 1202 that is representative of one or more computing systems and/or devices that may implement various techniques described herein. For example, the client device 102 discussed above with reference to FIG. 1 can be embodied as the computing device 1202. The computing device 1202 may be, for example, a server of a service provider, a device associated with the client (e.g., a client device), an on-chip system, and/or any other suitable computing device or computing system.

The example computing device 1202 as illustrated includes a processing system 1204, one or more computer-readable media 1206, and one or more Input/Output (I/O) Interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage 1212 may include volatile media (such as random access memory (RAM)) and/or nonvolatile media (such as read only memory (ROM), Flash memory, optical disks, magnetic disks, and so forth). The memory/storage 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1210 and computer-readable media 1206 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of modules that are executable by the computing device 1202 as software may be achieved at least partially in hardware, e.g., through use of computer-readable storage media and/or hardware elements 1210 of the processing system. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes. For instance, the computing device 1202 may be implemented as the computer 1214 class of a device that includes a personal computer, desktop computer, a multi-screen computer, laptop computer, netbook, and so on.

The computing device 1202 may also be implemented as the mobile 1216 class of device that includes mobile devices, such as a mobile phone, portable music player, portable gaming device, a tablet computer, a wearable device, a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein. For example, functionalities discussed with reference to the client device 102 may be implemented all or in part through use of a distributed system, such as over a "cloud" 1220 via a platform 1222 as described below.

The cloud 1220 includes and/or is representative of a platform 1222 for resources 1224. The platform 1222 abstracts underlying functionality of hardware (e.g., servers) and software resources of the cloud 1220. The resources 1224 may include applications and/or data that can be utilized while computer processing is executed on servers that are remote from the computing device 1202. Resources 1224 can also include services provided over the Internet and/or through a subscriber network, such as a cellular or Wi-Fi network.

The platform 1222 may abstract resources and functions to connect the computing device 1202 with other computing devices. The platform 1222 may also serve to abstract scaling of resources to provide a corresponding level of scale to encountered demand for the resources 1224 that are implemented via the platform 1222. Accordingly, in an interconnected device embodiment, implementation of functionality described herein may be distributed throughout the system 1200. For example, the functionality may be implemented in part on the computing device 1202 as well as via the platform 1222 that abstracts the functionality of the cloud 1220.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for visually correlating ink to an estimated user perspective, the system including: an input surface; one or more processors; and one or more computer-readable storage media storing computer-executable instructions that, responsive to execution by the one or more processors, cause the system to perform operations including: receiving an indication of input to the input surface; determining an output location for outputting ink to visually correlate the ink to an estimated user perspective of a location of the input to the input surface; and causing digital ink to be output at the output location.

In addition to any of the above described systems, any one or combination of: wherein the user perspective of the location of the input is estimated based on an estimated viewing angle of a user relative to the input surface; wherein the user perspective of the location of the input is estimated based on an estimated angle of an input device used to apply the input relative to the input surface; wherein the input is received via a pen, and wherein the user perspective of the location of the input is estimated based on an estimated angle of the pen relative to the input surface; wherein the input surface includes a first display device of a multi-display device, and the user perspective of the location of the input is estimated based on an estimated angle of the first display device relative to a second display device of the multi-display device; wherein the input surface includes a first display device of a multi-display device, the input proceeds from the first display device to a second display device of the multi-display device, and said determining the output location includes determining a location on the second display device to output the digital ink; wherein the input is received at the input surface at a first location, and wherein said causing includes causing the digital ink to be output at a second location that is different than the first location; wherein said determining the output location includes calculating a pixel offset from an input location wherein the input is received, and using the pixel offset to determine the output location; wherein the operations further include: detecting motion of the input surface; calculating a motion correction to compensate for the motion of the input surface; and causing the motion correction to be applied to the digital ink.

A computer-implemented method for applying motion correction to input, the method including: detecting motion of a display surface while input to the display surface occurs; calculating a motion correction to compensate for the motion of the display surface; and causing the motion correction to be applied to the input such that digital ink that is output based on the input is modified to match a known handwriting style of a user.

In addition to any of the above described methods, any one or combination of: wherein said detecting the motion of the display surface includes distinguishing between intended motion of the display surface, and unintended motion of the display surface, and using the unintended motion of the display surface to perform said calculating; wherein the known handwriting style is determined based on previous handwriting captured from the user; wherein said causing includes removing one or more ink strokes from the input to match the known handwriting style.

A computer-implemented method for applying motion correction to an input zone, the method including: detecting motion of a display surface while input to the display surface occurs; calculating a motion correction to compensate for the motion of the display surface; and causing the motion correction to be applied to the input such that an input zone used to recognize a particular gesture is modified using the motion correction.

In addition to any of the above described methods, any one or combination of: wherein said detecting the motion of the display surface includes distinguishing between intended motion of the display surface, and unintended motion of the display surface, and using the unintended motion of the display surface to perform said calculating; wherein said causing includes increasing a size of the input zone; wherein said detecting includes detecting greater motion of the display surface in a first direction than in a second direction, and wherein said calculating includes calculating the motion correction to include more correction in the first direction than in the second direction; wherein said detecting includes detecting greater motion of the display surface in a first direction than in a second direction, said calculating includes calculating the motion correction to include more correction in the first direction than in the second direction, and said causing includes increasing a size of the input zone in the first direction and based on the motion correction; wherein the particular gesture includes two consecutive taps on the display surface, and wherein said causing includes increasing the size of the input zone for recognizing the two consecutive taps as a double tap gesture; wherein the display surface is attached to a device body via a hinge, and wherein said detecting includes detecting the motion as a wobble of the display surface relative to the device body.

CONCLUSION

Techniques for input adjustment are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
a multi-display device that comprises a first display connected to a second display via a hinge device;
one or more processors; and
one or more computer-readable storage media storing computer-executable instructions that, responsive to execution by the one or more processors, cause the system to perform operations including:
receiving an input on the multi-display device;
detecting a motion of the multi-display device through the hinge device during the receiving of the input;
determining a motion correction for the input to be output based on a detected location of the input, and comparative evaluation of: a hinge angle for the first display relative to the second display during the receiving of the input and a threshold angle of the hinge device; and
causing digital ink to be output at an output location based on a result of the determining of the motion correction.

2. The system as described in claim 1, wherein the input is received via one selected from a group that comprises: a digital pen, a touch input, a voice input and a device input.

3. The system as described in claim 1, wherein said determining of the motion correction further comprises calculating a pixel offset from the detected location of the input, and wherein the pixel offset is determined from the comparative evaluation of the hinge angle and the threshold angle of the hinge device.

4. The system as described in claim 1, wherein the evaluation used for the determining of the motion correction further comprises evaluating a grip of the multi-display device by the user.

5. The system as described in claim 1, wherein the receiving detects that the input is received across both the first display and the second display.

6. The system as described in claim 1, wherein the determining of the motion correction for the input is further based on an evaluation of an instrument angle of an instrument used to provide the input relative to a threshold instrument angle.

7. The system as described in claim 6, wherein the determining of the motion correction for the input is further based on an evaluation of orientation information of a face of a user relative to the multi-display device.

8. A method comprising:
receiving an input on a multi-display device that comprises a first display and a second display connected via a hinge device;
detecting a motion of the multi-display device through the hinge device during the receiving of the input;
determining a motion correction for the input to be output based on a detected location of the input, and comparative evaluation of: a hinge angle for the first display relative to the second display during the receiving of the input and a threshold angle of the hinge device; and
causing digital ink to be output at an output location based on a result of the determining of the motion correction.

9. The method as described in claim 8, wherein the input is received via one selected from a group that comprises: a digital pen, a touch input, a voice input and a device input.

10. The method as described in claim 8, wherein said determining of the motion correction further comprises calculating a pixel offset from the detected location of the input, and wherein the pixel offset is determined from the comparative evaluation of the hinge angle and the threshold angle of the hinge device.

11. The method as described in claim 8, wherein the evaluation used for the determining of the motion correction further comprises evaluating a grip of the multi-display device by the user.

12. The method as described in claim 8, wherein the receiving detects that the input is received across both the first display and the second display.

13. The method as described in claim 8, wherein the determining of the motion correction for the input is further based on an evaluation of an instrument angle of an instrument used to provide the input relative to a threshold instrument angle.

14. The method as described in claim 13, wherein the determining of the motion correction for the input is further based on an evaluation of orientation information of a face of a user relative to the multi-display device.

15. A computer-storage device storing computer-executable instructions that, when executed by at least one processor, causes the at least one processor to execute a method comprising:
receiving an input on a multi-display device that comprises a first display and a second display connected via a hinge device;
detecting a motion of the multi-display device through the hinge device during the receiving of the input;
determining a motion correction for the input to be output based on a detected location of the input, and comparative evaluation of: a hinge angle for the first display relative to the second display during the receiving of the input and a threshold angle of the hinge device; and
causing digital ink to be output at an output location based on a result of the determining of the motion correction.

16. The computer-storage device as described in claim 15, wherein the input is received via one selected from a group that comprises: a digital pen, a touch input, a voice input and a device input.

17. The computer-storage device as described in claim 15, wherein the evaluation used for the determining of the motion correction further comprises evaluating a grip of the multi-display device by the user.

18. The computer-storage device as described in claim 15, wherein the receiving detects that the input is received across both the first display and the second display.

19. The computer-storage device as described in claim 15, wherein the determining of the motion correction for the input is further based on an evaluation of an instrument angle of an instrument used to provide the input relative to a threshold instrument angle.

20. The computer-storage device as described in claim 19, wherein the determining of the motion correction for the input is further based on an evaluation of orientation information of a face of a user relative to the multi-display device.

\* \* \* \* \*